US012057581B2

(12) United States Patent
Benson et al.

(10) Patent No.: US 12,057,581 B2
(45) Date of Patent: Aug. 6, 2024

(54) POLYAMIDE-IMIDE BINDER FOR LITHIUM BATTERY

(71) Applicant: SOLVAY SPECIALTY POLYMERS USA, LLC, Alpharetta, GA (US)

(72) Inventors: Bryan Benson, Ball Ground, GA (US); R. William Tilford, Stone Mountain, GA (US); Maurizio Biso, Milan (IT); Christine Hamon, Bollate (IT)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 981 days.

(21) Appl. No.: 16/980,855

(22) PCT Filed: Mar. 19, 2019

(86) PCT No.: PCT/EP2019/056759
§ 371 (c)(1),
(2) Date: Sep. 15, 2020

(87) PCT Pub. No.: WO2019/179971
PCT Pub. Date: Sep. 26, 2019

(65) Prior Publication Data
US 2021/0020946 A1 Jan. 21, 2021

Related U.S. Application Data

(60) Provisional application No. 62/646,694, filed on Mar. 22, 2018.

(51) Int. Cl.
*C08G 73/14* (2006.01)
*C08L 79/08* (2006.01)
(Continued)

(52) U.S. Cl.
CPC ............ *H01M 4/622* (2013.01); *C08G 73/14* (2013.01); *C08L 79/08* (2013.01); *H01M 4/133* (2013.01);
(Continued)

(58) Field of Classification Search
None
See application file for complete search history.

(56) References Cited

U.S. PATENT DOCUMENTS 3,661,832 A 5/1972 Stephens
3,669,937 A 6/1972 Zecher et al.
(Continued)

FOREIGN PATENT DOCUMENTS

EP 3297083 A1 3/2018
GB 1056564 A 1/1967
(Continued)

OTHER PUBLICATIONS

English translation of JP 2015/145483 (Year: 2015).*
(Continued)

*Primary Examiner* — Yoshitoshi Takeuchi
(74) *Attorney, Agent, or Firm* — Osha Bergman Watanabe & Burton LLP

(57) ABSTRACT

The present invention pertains to a lithiated polyamide-imide (LiPAI) polymer, a method of making the LiPAI, an electrode-forming composition comprising the LiPAI, a method of making a negative electrode with the electrode-forming composition; and a lithium-ion battery comprising the negative electrode.

12 Claims, 1 Drawing Sheet

Capacity Retention of Half Coin-Cells

(51) Int. Cl.
    *H01M 4/133*     (2010.01)
    *H01M 4/134*     (2010.01)
    *H01M 4/1393*     (2010.01)
    *H01M 4/1395*     (2010.01)
    *H01M 4/38*     (2006.01)
    *H01M 4/62*     (2006.01)
    *H01M 10/0525*     (2010.01)
    *H01M 4/02*     (2006.01)

(52) U.S. Cl.
    CPC ......... *H01M 4/134* (2013.01); *H01M 4/1393* (2013.01); *H01M 4/1395* (2013.01); *H01M 4/386* (2013.01); *H01M 4/625* (2013.01); *H01M 10/0525* (2013.01); *H01M 2004/027* (2013.01); *H01M 2004/028* (2013.01)

(56) References Cited

U.S. PATENT DOCUMENTS

| | | |
|---|---|---|
| 8,734,989 B2 | 5/2014 | Lee et al. |
| 2009/0136851 A1 | 5/2009 | Choi et al. |
| 2012/0088150 A1 | 4/2012 | Hwang |
| 2015/0044578 A1 | 2/2015 | Kourtakis et al. |
| 2016/0164096 A1* | 6/2016 | Yokotsuji .............. H01M 4/364 429/188 |
| 2017/0155151 A1 | 6/2017 | Bae et al. |

FOREIGN PATENT DOCUMENTS

| | | | | |
|---|---|---|---|---|
| JP | 2013089437 A | | 5/2013 | |
| JP | 2015/145483 | * | 8/2015 | ............. C08G 73/10 |
| JP | 2015145483 | * | 8/2015 | ............. C08G 73/10 |
| JP | 2015145483 A | | 8/2015 | |
| JP | 2017076600 A | | 4/2017 | |

OTHER PUBLICATIONS

International Search Report issued in Application No. PCT/EP2019/056759, mailed on Jun. 19, 2019 (4 pages).

Written Opinion issued in Application No. PCT/EP2019/056759, mailed on Jun. 19, 2019 (6 pages).

* cited by examiner

Capacity Retention of Half Coin-Cells
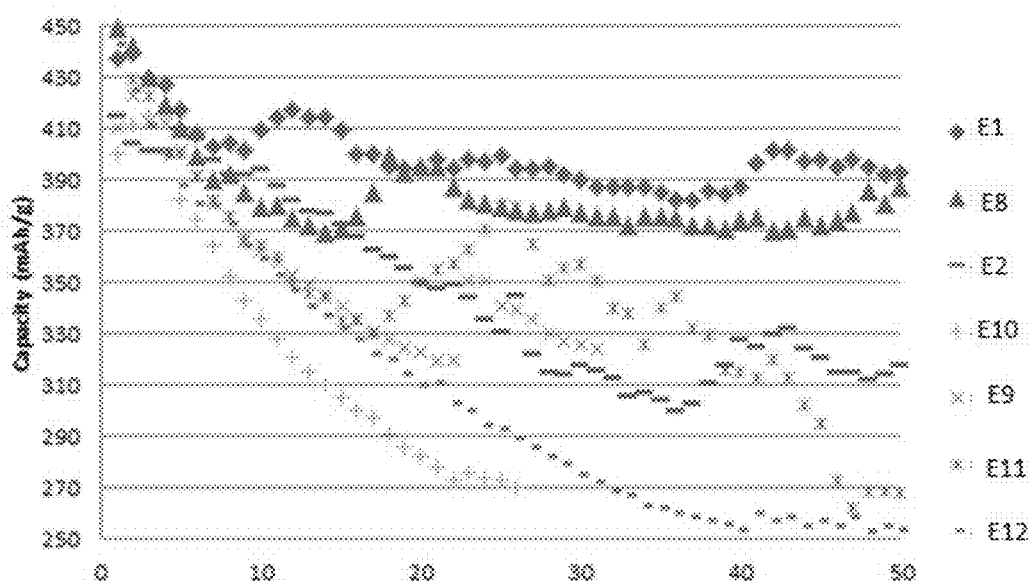

POLYAMIDE-IMIDE BINDER FOR LITHIUM BATTERY

CROSS-REFERENCE TO RELATED APPLICATIONS

This application is a U.S. national stage entry under 35 U.S.C. § 371 of International Application No. PCT/EP2019/056759 filed Mar. 19, 2019, which claims priority to U.S. provisional application No. U.S. 62/646,694 filed on Mar. 22, 2018, the whole content of which being herein incorporated by reference for all purposes.

FIELD OF THE INVENTION

The present invention generally relates to lithiated polyamide-imide (LiPAI) polymers and their use as binders in negative electrodes for lithium ion batteries.

BACKGROUND

Current lithium ion batteries are limited in their storage of electrical charge by the capacity of the negative electrode. There is a general view that the most direct path to creating the next generation of energy storage systems is to significantly increase the storage capacity of lithium ion batteries by incorporating silicon into the graphite negative electrode. Silicon is able to reversibly store far more lithium than graphite, and presently small quantities are blended into the negative electrode resulting in marked capacity increases, but current binders only accommodate limited silicon loading (<20 wt. %) before battery lifetime is significantly reduced because of reduced charge cycle stability. Further capacity improvements are limited because the silicon particles swell and shrink significantly as a result of the large quantities of lithium stored and released during charging and discharging. This produces mechanical stress that results in cracking and particle attrition, impeding the path of ions in the cell, which in turn diminishes battery performance with battery cycling.

One approach has been to focus on improving performance of the binder in the negative electrode. The binder holds the graphite and silicon particles together in a continuous layer in contact with both the current collector and the separator membrane that partitions the negative electrode and positive electrode. Traditionally, all graphite negative electrodes have relied on polyvinylidene fluoride (PVDF) as a binder. PVDF interacts favorably with graphite particles but does not adhere well to silicon particles, making the binder susceptible to failure resulting from mechanical stress caused by swelling and shrinking of the silicon during charge cycles.

New binders based on polyacrylic acid (PAA), and carboxymethyl cellulose with styrene butadiene (CMC-SBR) have been studied, however they are brittle and have been found to create failure points within the binder matrix itself.

Polyamide-imides (PAI) exhibit better adhesion to silicon, yet their widespread commercial use has been hindered, due in part to their unique processing requirements. Most PAIs are only soluble in organic solvents such as N-methyl-2-pyrrolidone (NMP) and to exploit their full potential as binders, they must be cured to high temperatures (e.g. >150-300° C.) in a gradual step-wise fashion. This processing requirement is costly and can be problematic for the overall battery manufacturing process.

Producing PAI via an acid chloride process generates hydrogen chloride as a byproduct. Left unremoved, the hydrogen chloride can cause corrosion if the PAI is used in a battery electrode. JP 2015145483 A2 (UNITIKA), addresses this problem by adding 1 to 1.02 mol per 1 mol of diamine of a lithium salt such as lithium hydroxide or lithium carbonate to the reaction mixture used to make the PAI, thereby converting the hydrogen chloride byproduct to lithium chloride. In the methods described by this reference, all or most of the lithium ions from the lithium salt are bound to the chloride and are therefore not available to form salts with any amic acid groups in the PAI. In addition, this reference does not disclose making a negative electrode with an aqueous solution of the PAI.

US 2012/0088150 (SAMSUNG) is generally directed to an electrode including a PAI-based binder for a lithium-ion secondary battery where a 1,3-benzenediamine peak is not observed when a composition including components extracted from the electrode by a solvent capable of dissolving the polyamideimide (PAI)-based binder is analyzed by pyrolysis-gas chromatography. The reference does not disclose, among other things, lithiated PAI.

US 2015/0044578 (EI DU PONT DE NEMOURS AND CO.) is directed to binder precursor compositions containing certain PAIs for use in cathodes of lithium-ion batteries. The reference generally discloses that acid sites in the unimidized or partially imidized binder precursor compositions can optionally be exchanged with cations such as lithium by contact, preferably with a non-aqueous solution of lithium salt, but no specific amounts are provided. Long lists of possible dianhydrides and diamines are described; however trimellitic anhydride monoacid chloride (TMAC) is not disclosed, and only a non-lithiated pyromellitic dianhydride (PMDA)-oxydianiline (ODA) copolymer is actually described and exemplified. The reference also provides no suggestion, inter alia, that PAIs could be used as binders in negative electrodes, with their far different chemistry.

JP 2013-089437, A (TORAY IND. INC.) discloses a binder material for the anode of a lithium-ion battery which, in some embodiments, can include a PAI and a lithium salt. In particular, the reference provides examples of a solution including a PAI, a negative electrode active material, and a lithium salt; however, the PAI is highly imidized and the binder solutions are non-aqueous.

U.S. Pat. No. 8,734,989 (SAMSUNG SDI) is generally directed to a negative electrode for a rechargeable lithium battery including a high-strength binder layer that is distinct from a negative active material layer to reduce the expansion rate of the electrode and improve cycle-life. In some embodiments, the high-strength binder can include a lithium salt in addition to a polymer selected from a long list of diverse polymers. One of the polymers is generically described as an "amide-imide-based polymer;" however, the reference states that the high strength binder must have a crystallinity of at least 10% and a glass transition temperature (Tg) of not more than 100° C., and no PAI is exemplified.

US 2017/0155151 discloses water-soluble lithiated polyamic acids for use in binders for lithium-ion batteries to prevent a decrease in initial efficiency. This reference does not disclose PAIs, which have a different chemical structure and properties. Moreover, the lithiated polyamic acids described are highly imidized, have an acid equivalent of less than 300 g/eq., have a molecular weight greater than 10,000 g/mol, and are prepared specifically with lithium hydroxide.

Accordingly, a need exists for PAI binders for negative electrodes that are soluble in low cost and environmentally-friendly solvents such as water, and that preferably achieve high cycle stability without the requirement of high temperature curing.

BRIEF DESCRIPTION OF THE FIGURES

FIG. 1 is a plot illustrating the capacity retention of the full coin-cell batteries of Examples E11 and E12 and Comparative Examples C13 to C17.

DETAILED DESCRIPTION OF PREFERRED EMBODIMENTS

It has now surprisingly been found that the capacity retention of lithium-ion batteries can be significantly improved by the use of lithiated polyamide-imide (LiPAI) polymers as electrode binders. Moreover, the inventive electrodes can be made using an environmentally-friendly aqueous solution, and, in some embodiments, achieve unexpectedly good capacity retention without the need for high temperature curing of the LiPAI.

As will be described in detail below, exemplary embodiments are directed to a LiPAI; a method of making the LiPAI; an electrode-forming composition comprising the LiPAI, an electrode active material, optionally at least one electro-conductive additive, and water; a method of making a negative electrode with the electrode-forming composition; and a lithium-ion battery comprising the negative electrode.

The Lithiated Poly(Amide Imide) (LiPAI)

As used herein, the term "lithiated polyamide-imide (LiPAI)" means any polymer comprising:

0 to 50 mol. % of at least one recurring unit $R_{imide}$ of formula:

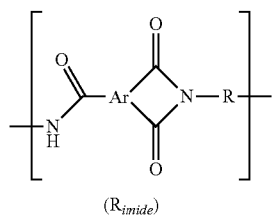

($R_{imide}$)

0 to 70 mol. % of at least one recurring unit $R_{amic\ acid}$ of formula:

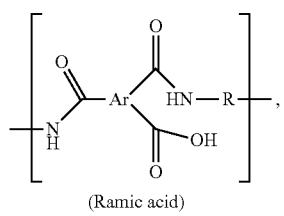

(Ramic acid)

and 30 to 100 mol. % of at least one recurring unit $R_{Li\ salt}$ of formula:

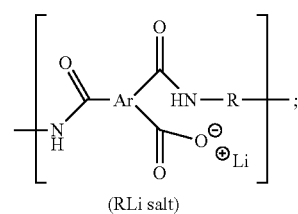

(RLi salt)

provided that recurring units $R_{imide}$, $R_{amic\ acid}$, and $R_{Li\ salt}$ collectively represent more than 50 mol. %, preferably at least 60 mol. %, 75 mol. %, 90 mol %, 95 mol %, 99 mol. % of recurring units in the LiPAI.

Referring to the formulae for $R_{imide}$, $R_{amic\ acid}$, and $R_{Li\ salt}$ above:

Ar is a trivalent aromatic group selected from the group consisting of:

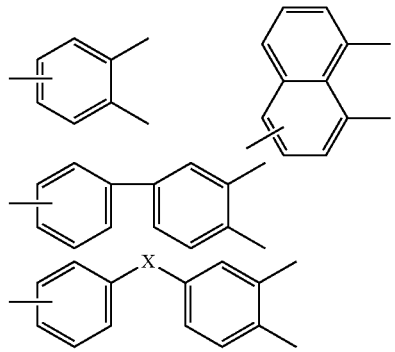

and corresponding optionally substituted structures. Preferably, Ar is:

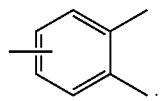

X is selected from the group consisting of —O—, —C(O)—, —CH$_2$—, —C(CF$_3$)$_2$—, and —(CF$_2$)$_p$—, where p is an integer from 1 to 5.

R is a divalent aromatic group selected from the group consisting of:

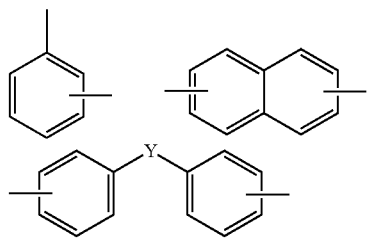

-continued

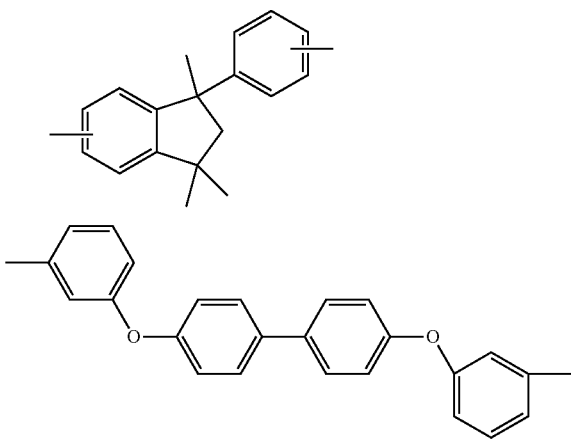

and corresponding optionally substituted structures. Preferably, R is:

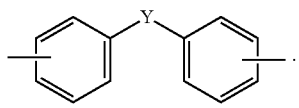

Y is selected from the group consisting of —O—, —S—, —SO$_2$—, —CH$_2$—, —C(O)—, —C(CF$_3$)$_2$—, —(CF$_2$)$_q$—, where q is an integer from 0 to 5. Preferably Y is —O— or —CH$_2$—, and most preferably, Y is —O—.

In the formulae that follow, the floating amide bond indicates that the amide can be bonded to either of the closest carbons to the floating amide bond on the ring. In other words,

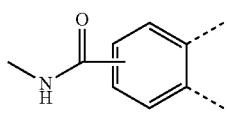

in each formula represents both

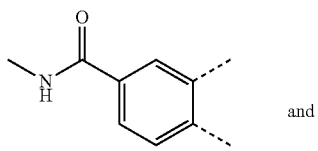

and

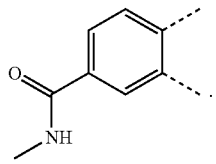

In some embodiments, recurring units $R_{imide}$ in the LiPAI are selected from at least one recurring unit of formula:

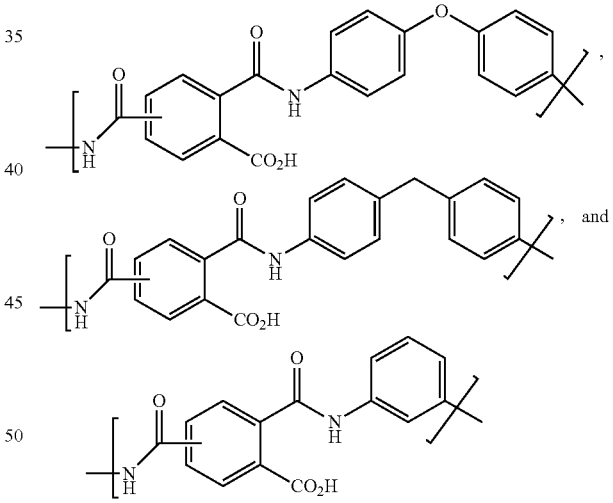

In some embodiments, recurring units $R_{amic\ acid}$ in the LiPAI are selected from at least one recurring unit of formula:

In some embodiments, recurring units $R_{Li\ salt}$ in the LiPAI are selected from at least one recurring unit of formula:

-continued

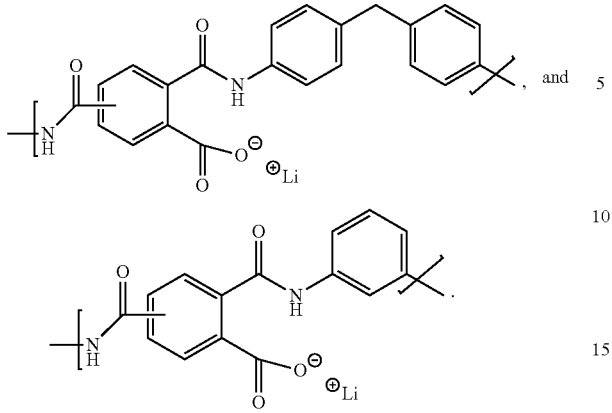, and

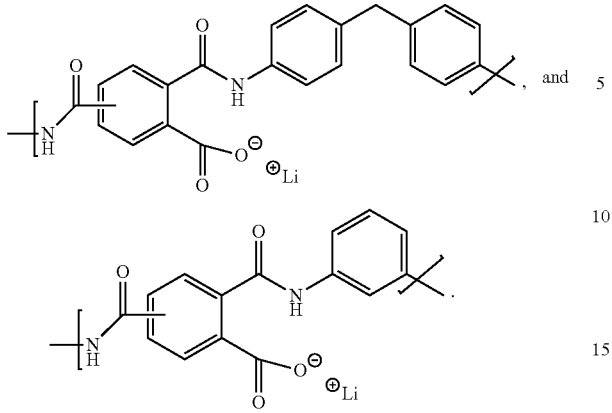.

In some embodiments, the recurring units $R_{imide}$, $R_{amic\ acid}$, and $R_{Li\ salt}$ in the LiPAI are respectively units of formulae:

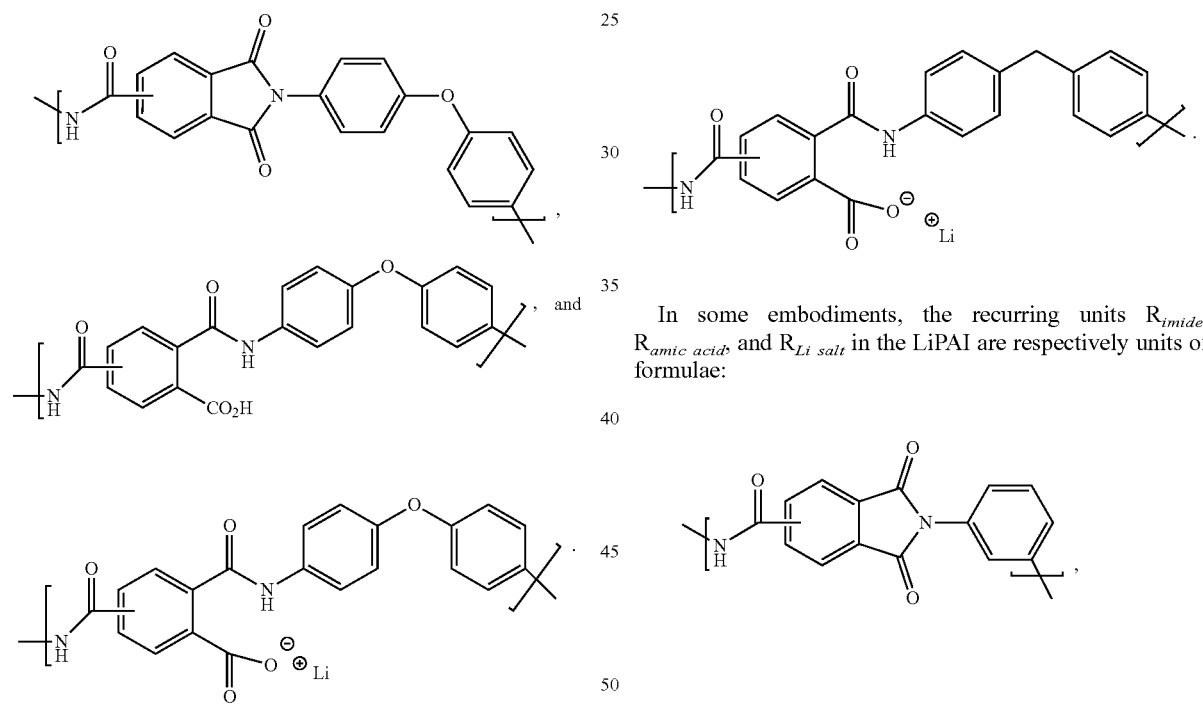, 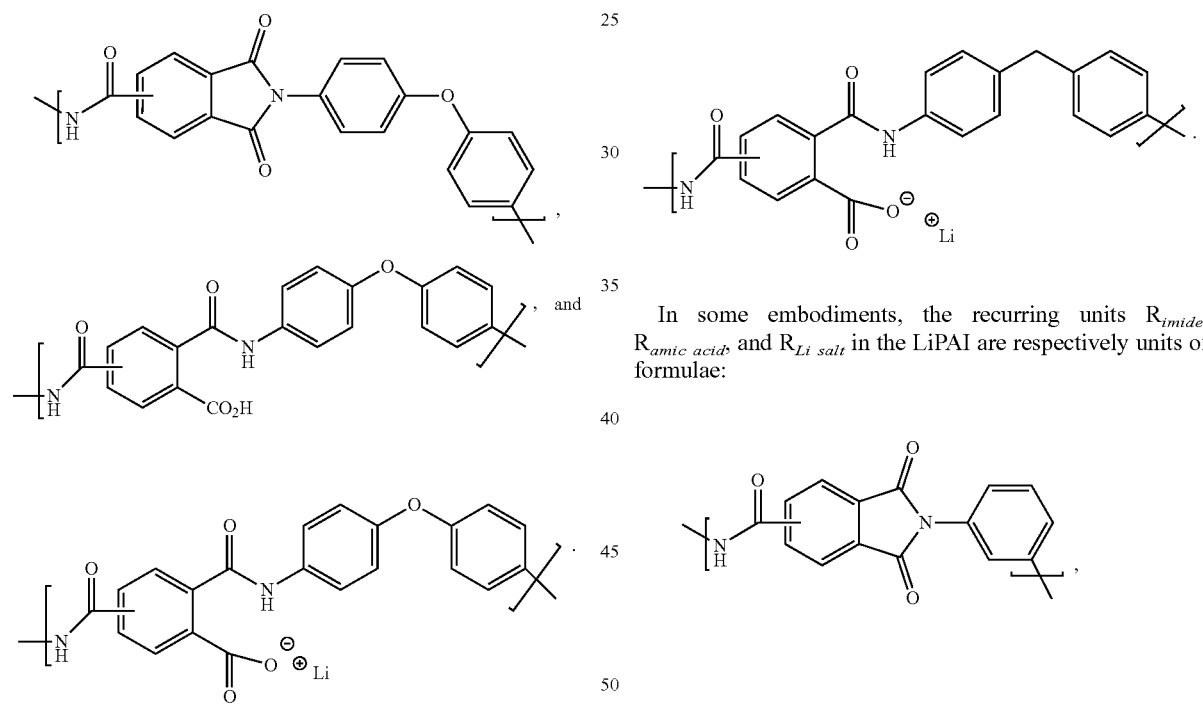, and 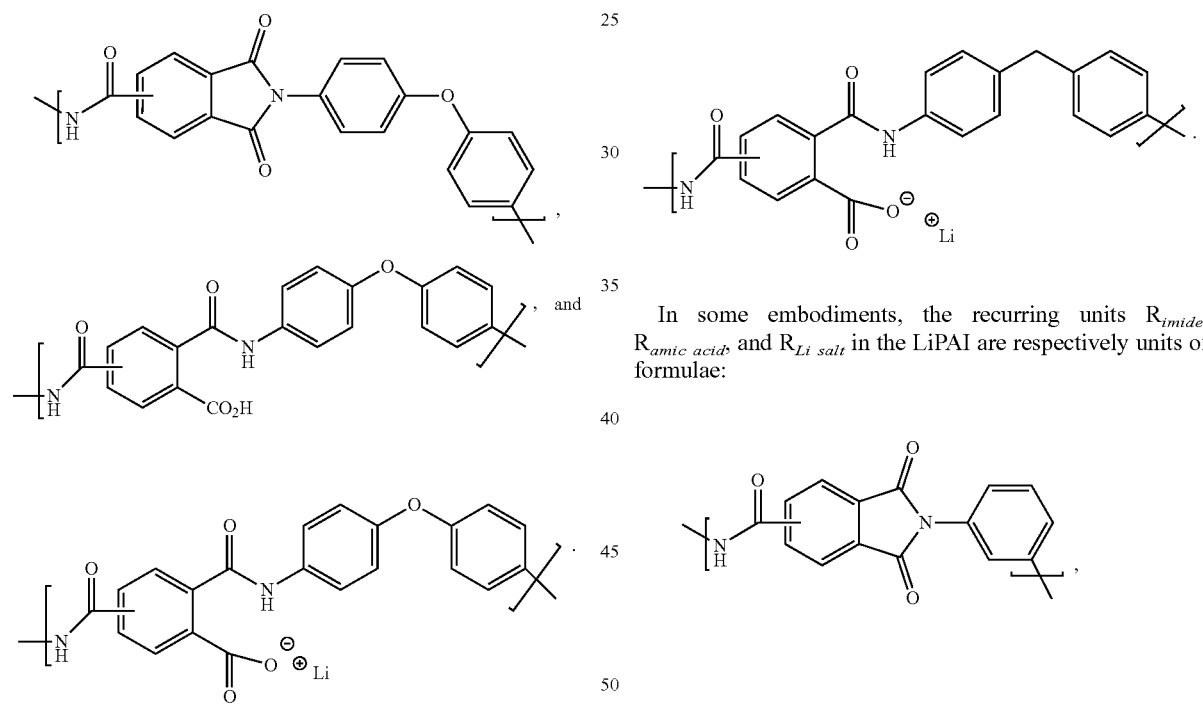.

Preferably, recurring units $R_{Li\ salt}$ in the LiPAI are units of formula:

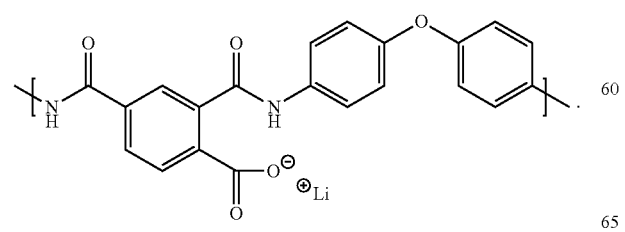.

In some embodiments, the recurring units $R_{imide}$, $R_{amic\ acid}$, and $R_{Li\ salt}$ in the LiPAI are respectively units of formulae:

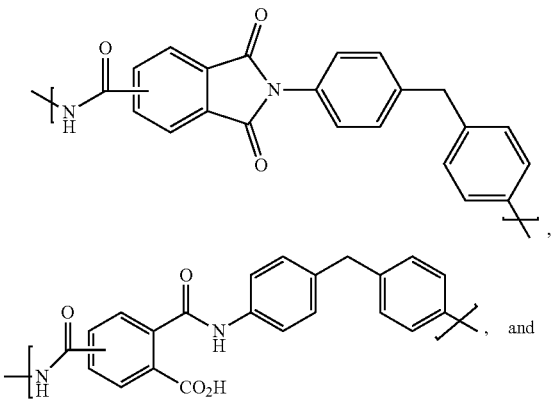, 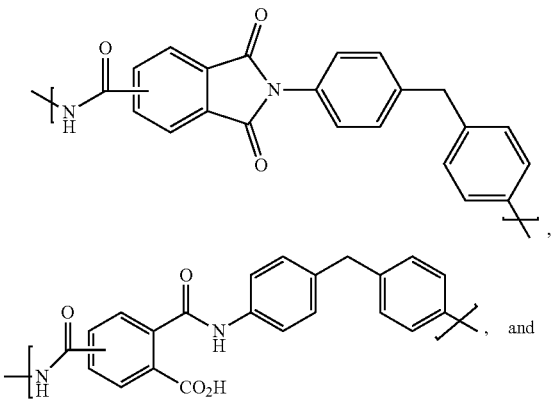, and 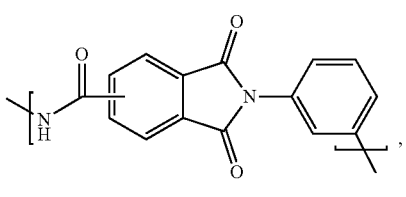.

In some embodiments, the recurring units $R_{imide}$, $R_{amic\ acid}$, and $R_{Li\ salt}$ in the LiPAI are respectively units of formulae:

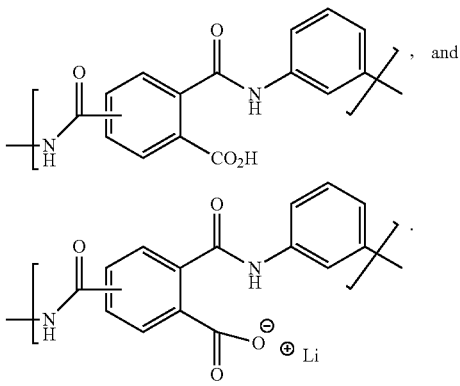, 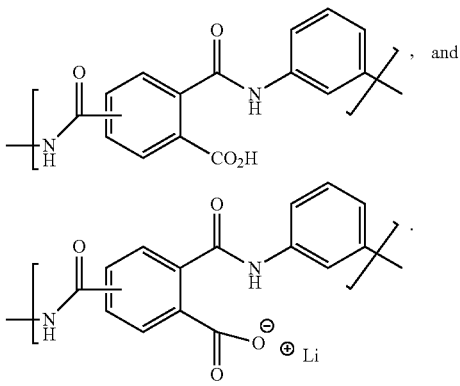, and 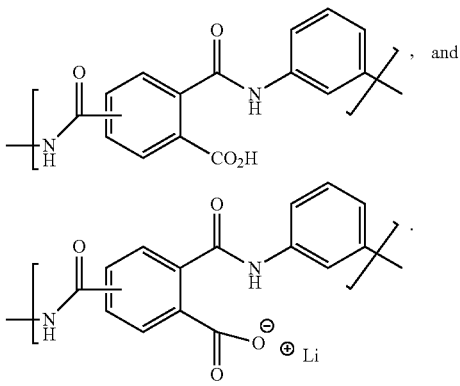.

In some embodiments, the LiPAI comprises more than one, for example two, of each of recurring units $R_{imide}$, $R_{amic\ acid}$, and $R_{Li\ salt}$. Accordingly, in some aspects the LiPAI comprises:

a) recurring units $R_{imide}$ of formulae:

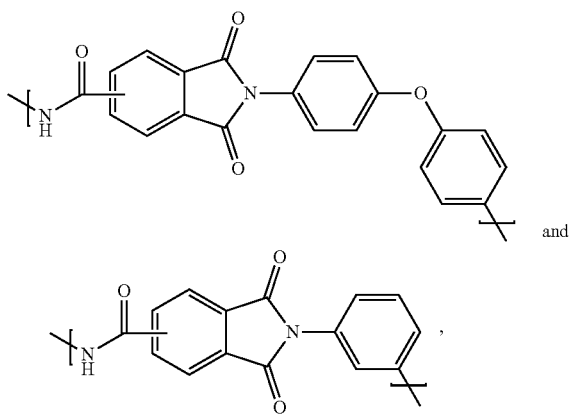

and b) recurring units $R_{amic\ acid}$ of formulae:

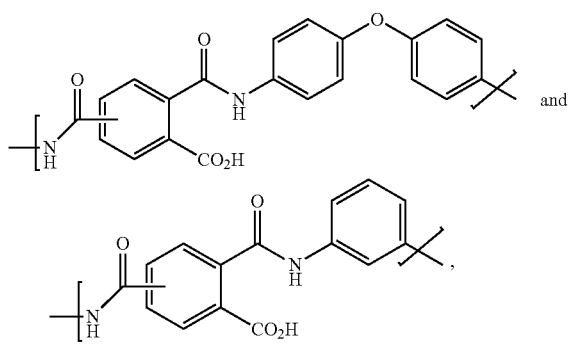

and c) recurring units RLi salt of formulae:

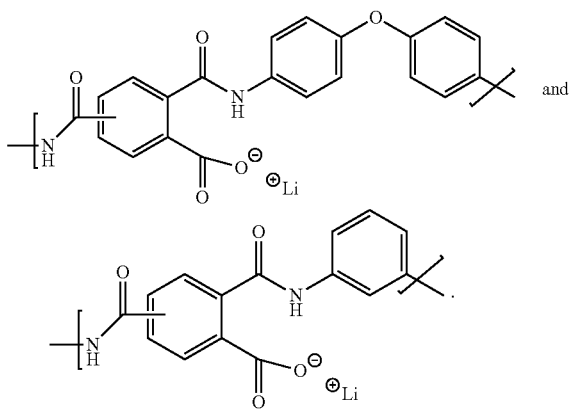

In some embodiments, the LiPAI includes less than 50 mol %, preferably less than 49 mol. %, 45 mol. %, 40 mol. %, 30 mol. %, 20 mol. %, 10 mole. %, 5 mol. %, 2 mol. %, 1 mol. % of the $R_{imide}$ recurring units. In some embodiments, the LiPAI is free of recurring units $R_{imide}$.

In some embodiments, the LiPAI includes less than 70 mol. %, preferably less than 60 mol. %, 50 mol. %, 40 mol. %, 30 mol. %, 20 mol. %, 10 mol. %, 5 mol. %, 2 mol. %, 1 mol. % of recurring units $R_{amic\ acid}$.

Preferably, the LiPAI includes at least 30 mol. %, 35 mol. %, 40 mol. %, 45 mol. %, 50 mol. %, 60 mol. %, 70 mol. %, 80 mol. %, 90 mol. %, 95 mol. %, 99 mol. % of recurring units $R_{Li\ salt}$. Most preferably, all of the recurring units in the LiPAI are recurring units $R_{Li\ salt}$.

In some embodiments, the mole ratio, $R_{imide}/(R_{amic\ acid}+R_{Li\ salt})$ is 1.0 or less, preferably 0.9, 0.8, 0.7, 0.6, 0.5, 0.4, 0.3, 0.2, 0.1 or less.

In some embodiments, the mole ratio, $R_{Li\ salt}/(R_{imide}+R_{amic\ acid})$ is 0.5, 0.6, 0.7, 0.8, 0.9, 1.0 or more. For example, the mole ratio, $R_{Li\ salt}/(R_{imide}+R_{amic\ acid})$ is preferably greater than 2, 5, 10, 20, 30, 40, 50, 60, 70, 80, 90, 95, 99.

In a preferred embodiment, the amount of recurring units $R_{amic\ acid}$ ranges from 0 to 50 mol. %, and the amount of recurring units $R_{Li\ salt}$ ranges from 50 to 100 mol. %.

Determination of the relative amounts of recurring units $R_{amic\ acid}$, and $R_{Li\ salt}$ in the LiPAI can be performed by any suitable method. For example the amount of recurring units $R_{imide}$ (degree of imidization) can be assessed by NMR, and the amount of recurring units $R_{amic\ acid}$, and $R_{Li\ salt}$, can be assessed by NMR, elemental analysis, or titration.

The LiPAI has an acid equivalent greater than 300 grams per equivalent (g/eq) of acid. Preferably, the LiPAI has an acid equivalent greater than 325 g/eq, more preferably greater than 350 g/eq, and most preferably at least 375 g/eq or more.

The LiPAI is preferably water soluble. As used herein "water soluble" or "soluble in water" means that at least 99 wt. % of the LiPAI, based on the total weight of the LiPAI, dissolves in deionized water to form a homogenous solution at 23° C. with moderate stirring.

In some embodiments, the LiPAI has a number average molecular weight (Mn) of at least 1,000 g/mol, preferably at least 2,000 g/mol, more preferably at least 4,000 g/mol. In some embodiments, the LiPAI has a number average molecular weight (Mn) of at most 10,000 g/mol, preferably at least 8,000 g/mol, more preferably at least 6,000 g/mol.

The LiPAI detailed above may be used as in the preparation of a binder for negative electrodes in lithium-ion batteries as described below.

Methods of Making the Lithiated Poly(Amide Imide) (Li-PAI)

Exemplary embodiments are also directed to a method of making the LiPAI described above.

As used herein, "polyamide-imide (PAI)" means any polymer comprising:

0 to 50 mol. % of at least one recurring unit $R_{imide}$ of formula:

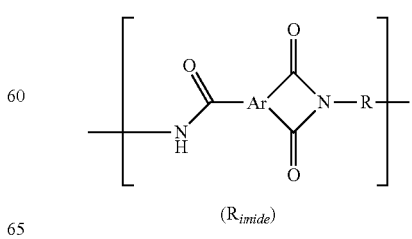

($R_{imide}$)

and
50 to 100 mol. % of at least one recurring unit $R_{amic\ acid}$ of formula:

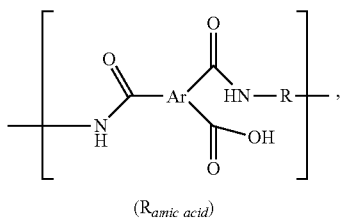

($R_{amic\ acid}$)

provided that recurring units $R_{imide}$ and $R_{amic\ acid}$ collectively represent more than 50 mol. %, preferably at least 60 mol. %, 75 mol. %, 90 mol %, 95 mol %, 99 mol. % of recurring units in the PAI, and Ar and R are as defined above.

In some embodiments, recurring units $R_{imide}$ in the PAI are selected from at least one recurring unit of formula:

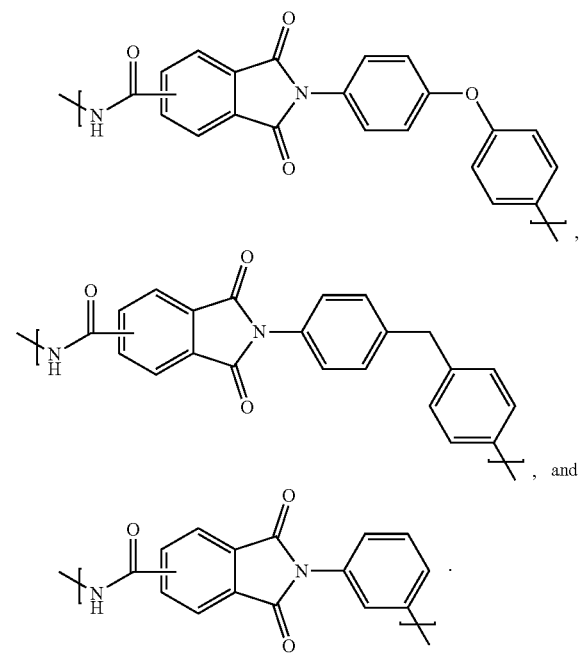

In some embodiments, recurring units $R_{amic\ acid}$ in the PAI are selected from at least one recurring unit of formula:

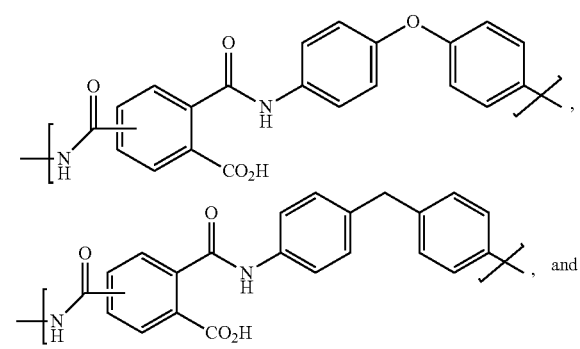

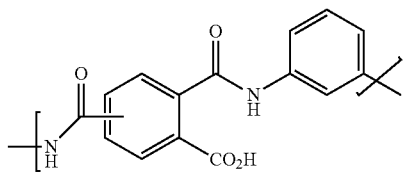

In some embodiments, the recurring units $R_{imide}$ and $R_{amic\ acid}$ in the PAI are respectively units of formulae:

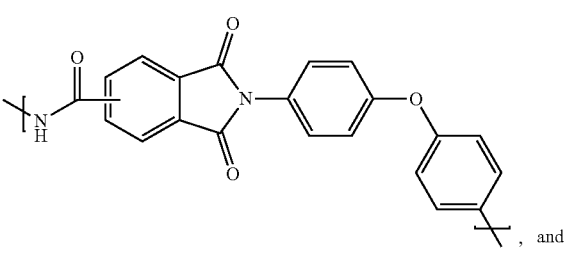

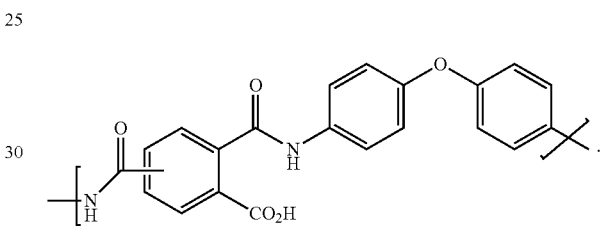

In some embodiments, the recurring units $R_{imide}$, and $R_{amic\ acid}$ in the PAI are respectively units of formulae:

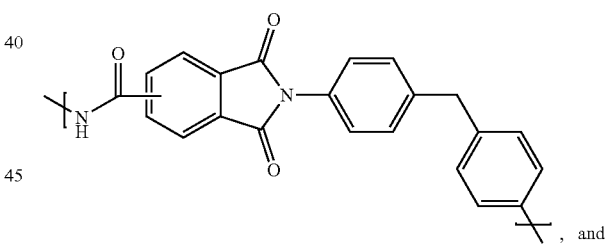

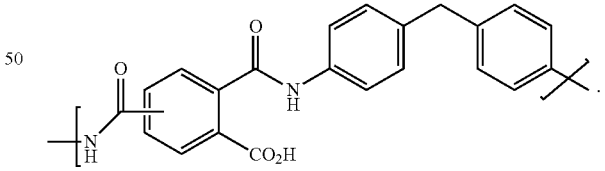

In some embodiments, the recurring units $R_{imide}$, and $R_{amic\ acid}$ in the PAI are respectively units of formulae:

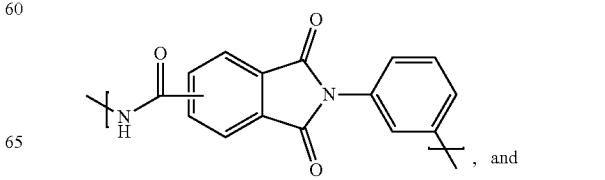

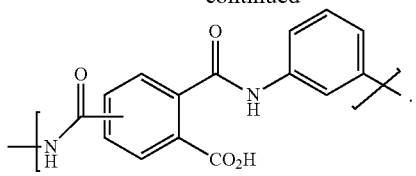

Polyamide-imide polymers are available from Solvay Specialty Polymers USA, L.L.C. under the trademark, TORLON® PAI.

In some embodiments, the PAI includes less than 50 mol %, preferably less than 49 mol. %, 45 mol. %, 40 mol. %, 30 mol. %, 20 mol. %, 10 mole. %, 5 mol. %, 2 mol. %, 1 mol. % of the $R_{imide}$ recurring units. Most preferably the PAI is free of recurring units $R_{imide}$.

In some embodiments, the PAI includes at least 50 mol. %, preferably at least 60 mol. %, 70 mol. %, 80 mol. %, 90 mol. %, 95 mol. %, 99 mol. %, and most preferably 100 mol. % of recurring units $R_{amic\ acid}$.

The PAI detailed above may be used as in the preparation of LiPAI as described above.

PAI copolymers can be manufactured according to known methods in the art. For example, processes for preparing PAI polymers are disclosed in detail in British Patent No. 1,056,564, U.S. Pat. Nos. 3,661,832 and 3,669,937.

PAI copolymers can be manufactured by a process including the polycondensation reaction between at least one acid monomer chosen from trimellitic anhydride and trimellitic anhydride monoacid halides and at least one comonomer chosen from diamines and diisocyanates. In some embodiments, the mol ratio of the at least one acid monomer to the comonomer is 1:1.

Among the trimellitic anhydride monoacid halides, trimellitic anhydride monoacid chloride (TMAC) is preferred:

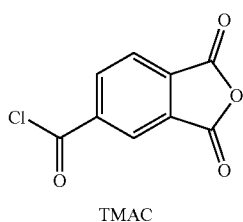 [SMILES: O=C(Cl)c1ccc2c(c1)C(=O)OC2=O]

TMAC

When polymerized, the acid monomers can exist in either an imide form or an amic acid form.

The comonomer can comprise one or two aromatic rings. Preferably, the comonomer is a diamine. More preferably, the diamine is selected from the group consisting of 4,4'-diaminodiphenylmethane (MDA), 4,4'-diaminodiphenylether (ODA), m-phenylenediamine (MPDA), and combinations thereof:

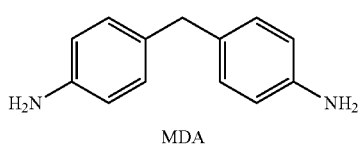

MDA

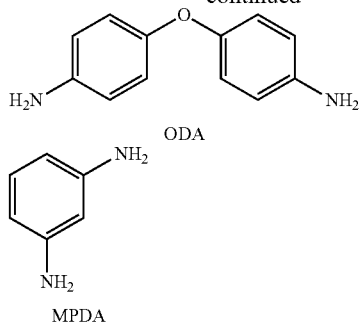

ODA

MPDA

An example of making a TMAC-ODA copolymer is described below in Example 1.

LiPAIs can be prepared from the PAI copolymers by neutralizing amic acid groups with a lithium salt. Therefore, in some aspects, the invention includes a method of lithiating a PAI comprising contacting the PAI with a lithium salt in a solvent.

The lithium salt can be any salt of lithium capable of neutralizing amic acid groups. In some embodiments, the lithium salt is selected from the group consisting of lithium carbonate, lithium hydroxide, lithium bicarbonate, and combinations thereof, preferably lithium carbonate. In some embodiments, the lithium salt is free of lithium hydroxide.

The solvent can be any solvent capable of dissolving the lithium salt and the resulting LiPAI. Preferably the solvent is selected from at least one of water, NMP, and alcohols, such as, for example, methanol, isopropanol, and ethanol. Preferably, the solvent includes less than 5 wt. %, preferably less than 2 wt. %, preferably less than 1 wt. % of NMP. More preferably, the solvent is free of NMP. Most preferably, the solvent is water.

Preferably the concentration of the lithium salt in the solvent ranges from 3 to 30 wt. %, preferably from 5 to 30 wt. %, more preferably 10 to 30 wt. %, based on the total weight of the solvent and the lithium salt.

In some embodiments, the concentration of the lithium salt in the solvent provides at least 1.5 eq., 2 eq., 2.5 eq., 3 eq., 4, eq of lithium to acid groups. In some embodiments, the concentration of the lithium salt in the solvent provides at most 5 eq., preferably at most 4, eq. of lithium to acid groups.

In some embodiments, the method further includes heating the solution of the lithium salt and the PAI (or LiPAI) to a temperature ranging from 50° C. to 90° C., preferably from 60° C. to 80° C., most preferably from 65° C. to 75° C., preferably for a time ranging from 15 min to 6 hours, preferably 1 to 2 hours.

In some embodiments, the method further includes lowering the pH of the LiPAI obtained as above detailed by adding to the reaction mixture after lithiation at least one source of acid, for example, as a mineral acid or as an organic acid such as acetic acid, formic acid, oxalic acid, benzoic acid, or as an acid generating species, such as a polymer having acidic sites.

Following lithiation, the concentration of the LiPAI in the solution preferably ranges from 1 to 20 wt. %, preferably 5 to 15 wt. %, most preferably 5 to 10 wt. %, based on the total weight of the LiPAI and the solvent.

The LiPAI can be isolated as a solid from the lithiating solution and optionally stored for later use. The solid LiPAI can also be dissolved (or re-dissolved) in water to prepare the aqueous electrode-forming composition described below. Preferably, however, the solution including the LiPAI is an aqueous solution that can be used directly, optionally with further dilution with water, in preparing the electrode-forming composition as described below.

Electrode-Forming Composition Including the LiPAI

The LiPAI can be desirably incorporated into an aqueous electrode-forming composition for negative electrodes of lithium-ion secondary batteries.

The electrode-forming composition comprises the LiPAI as described above, an electrode active material, optionally at least one electro-conductive additive, and water. The electrode-forming composition is preferably in the form of an aqueous dispersion, preferably a homogeneously-dispersed aqueous dispersion.

The electrode active material comprises a carbon-based material and a silicon-based material.

In some embodiments, the carbon-based material may be, for example, graphite, such as natural or artificial graphite, graphene, or carbon black. These materials may be used alone or as a mixture of two or more thereof. The carbon-based material is preferably graphite.

The silicon-based material may be one or more selected from the group consisting of silicon, alkoxysilane, aminosilane, silicon carbide and silicon oxide. Preferably, the silicon-based material is silicon.

The optional electro-conductive additive may be selected from carbonaceous materials such as carbon black, graphite fine powder, carbon nanotubes, graphene, or fiber, or fine powder or fibers of metals such as nickel or aluminum. The optional electro-conductive additive is preferably carbon black. Carbon black is available, for example, under the brand names, Super P® or Ketjenblack®. When present, the electro-conductive additive is different from the carbon-based material described above.

In some embodiments, the electrode-forming composition (and/or the electrode described below) includes an excess amount of lithium salt ranging from 1.5 to 5 eq., preferably 2 eq. to 5 eq., 2.5 eq. to 5 eq., 3 eq. to 4 eq., to acid groups.

Further, the electrode-forming composition of the invention can contain at least one thickener; when present, the amount of thickener (also designated as rheology modifier) is not particularly limited and generally ranges between 0.1 and 10% wt, preferably between 0.5 and 5% wt, with respect to the total weight of the composition. The thickener is generally added in order to prevent or slow down the settling of the powdery electrode material from the aqueous composition of the invention, while providing appropriate viscosity of the composition for a casting process. Non-limitative examples of suitable thickeners include, notably, organic thickeners such as partially neutralized poly(acrylic acid) or poly(methacrylic acid), carboxylated alkyl cellulose like carboxylated methyl cellulose and inorganic thickeners such as natural clays like montmorillonite and bentonite, manmade clays like laponite and others like silica and talc.

Method of Making Negative Electrodes

The electrode-forming composition can be used in a method for making a negative electrode. The method comprises:

(i) contacting at least one surface of a metal substrate with the electrode forming composition,
(ii) drying the electrode-forming composition at a temperature less than or equal to 150° C., and
(iii) compressing the dried electrode-forming composition on the metal substrate to form the negative electrode.

In some embodiments, contacting at least one surface of the metal substrate with the electrode forming composition includes casting, printing, or roll-coating the electrode forming composition on at least one surface of the metal substrate.

The metal substrate is generally a foil, mesh or net made from a metal, such as copper, aluminum, iron, stainless steel, nickel, titanium or silver.

The compression step (iii) may include calendering to achieve a target porosity and density for the negative electrode. In some embodiments the dried electrode forming material on the metal substrate is hot pressed at a temperature ranging from 25° C. to 130° C., preferably about 60° C.

The preferred target porosity for the negative electrode ranges from 15% to 40%, preferably from 25% to 30%. The porosity of the negative electrode is calculated as the complementary to unity of the ratio between the measured density and the theoretical density of the electrode, where:
  the measured density is given by the mass divided by the volume of a circular portion of the negative electrode having diameter equal to 24 mm and a measured thickness; and
  the theoretical density of the negative electrode is calculated as the sum of the product of the densities of the components of the electrode multiplied by their mass ratio in the electrode formulation.

Negative Electrodes Including the LiPAI

Some embodiments are directed to negative electrodes obtained by the method as described above.

The negative electrode preferably comprises, based on the total weight of the electrode:
  0.5 to 15 wt. %, preferably 0.5 to 10 wt. % of the LiPAI binder,
  75 to 95 wt. %, preferably 85 to 90 wt. % of the carbon-based material,
  3 to 50 wt. %, preferably 10 to 50 wt. % of the silicon-based material, and
  0 to 5 wt. %, preferably 0.5 to 2.5 wt. %, more preferably about 1 wt. % of the electro-conductive additive.

In some embodiments, the negative electrode includes 0.5 to 5 wt. %, preferably 0.5 to 3 wt. % of the LiPAI, based on the total weight of the electrode.

In some aspects, the negative electrode includes 20 to 50 wt. %, preferably 30 to 50 wt. % of the silicon-based material.

In some embodiments, the negative electrode of the invention is uncured. As used herein "uncured" means that the LiPAI (e.g., in the electrode or electrode-forming composition) has not been exposed to a curing temperature of greater than 150° C. The LiPAI in the uncured electrode may have a number average molecular weight of at most 10,000 g/mol, preferably at most 9,000 g/mol, 8,000 g/mol, 7,000 g/mol.

In alternative embodiments, the negative electrode of the invention is a cured. As used herein "cured" means that the LiPAI (e.g., in the electrode or electrode-forming composition) has been exposed to a curing temperature of greater than 150° C., preferably from 150° C. to 300° C. The LiPAI in the cured electrode may have a number average molecular weight greater than 8,000 g/mol, preferably greater than 10,000 g/mol.

The LiPAI having the molecular weights described above are more easily processed than are polymers of higher molecular weight.

The Applicant has surprisingly found that the negative electrodes of the present invention, in particular the uncured negative electrodes, exhibit significantly greater capacity retention than negative electrodes using comparative negative electrode binders.

Battery Including the Negative Electrode

The negative electrode of the invention is particularly suitable for use in lithium-ion in secondary batteries, which can be prepared by standard methods known to those of skill in the art.

Accordingly, an embodiment of the invention is directed to a lithium ion secondary battery comprising the negative electrode of the present invention together with a positive electrode, and electrolyte, and a separator.

In some embodiments, the battery of the invention exhibits a percent capacity retention based on the initial capacity of the battery of at least 85%, preferably at least 90%, after 50 charge/discharge 10 h/10 h cycles with positive cut off of 1.5 V and negative cut off of 0.05V.

In some embodiments, the inventive battery exhibits a 2% or less change in the percent capacity retention (based on the initial capacity of the battery) after 50 of the charge/discharge cycles described above, as compared with after 25 the charge/discharge cycles.

Exemplary embodiments will now be described in the following non-limiting examples.

EXAMPLES

Raw Materials

The following raw materials were used in the examples below:

Torlon® PAI 4000T and AI-50 available from Solvay Specialty Polymers USA, LLC;

Trimellitic acid chloride (TMAC), oxydianiline (ODA) and m-phenylenediamine (MPDA), available from Aldrich;

N-methylpyrrolidone (NMP) available from VWR International or Sigma Aldrich;

Lithium carbonate available from Sigma-Aldrich;

Silicon/carbon, commercially available as BTR 450-B from BTR (a mixture of Si and graphite with a silicon content of 7.25%). The theoretical capacity is 450 mAh/g;

Carbon black, available as SC45 from Imerys S.A;

Carboxymethylcellulose (CMC), available as MAC 500LC from Nippon Paper;

Styrene-Butadiene Rubber (SBR) suspension (40 wt. % in water), available as Zeon® BM-480B from ZEON Corporation;

Poly(amic acid) aqueous solution (35% w/w) available from Sigma Aldrich;

Ethylene carbonate: dimethyl carbonate=1:1 in weight percent, available as Selectilyte™ LP 30 from BASF;

Fluoroethylene carbonate (F1EC) available from Sigma Aldrich; and Vinylene carbonate available from Sigma Aldrich.

Example 1a: Preparation of TMAC-ODA (50-50) PAI Copolymer

ODA monomer (60.0 g, 0.3 moles) was charged into a 4-neck jacketed round-bottom flask fitted with overhead mechanical stirrer. NMP (250 mL) was charged to the flask and the mixture was cooled to 10° C. with mild agitation under a nitrogen atmosphere. The flask was fitted with a heated addition funnel to which TMAC (64.0 g, 0.3 moles) was charged and heated to a minimum of 100° C. The molten TMAC was added to the solution of diamine in NMP at a rate sufficient not to exceed 40° C. with vigorous agitation. Once the addition was complete, external heating was applied to maintain 35-40° C. for 2 hours. Additional NMP (50 mL) was added and the reaction mixture discharged into a 500 mL beaker. The polymer solution was slowly added to water (4000 mL) in a stainless steel high-shear mixer. The precipitated polymer was filtered and washed multiple times with water to remove residual solvent and acid by-product. Degree of imidization, as measured by acid number titration was no higher than 50 mol. %.

Example 1b: Preparation of (TMAC-ODA)$_{90}$ (TMAC-MPDA)$_{10}$ PAI Copolymer

ODA (55.7 g, 0.28 moles) and MPDA monomer (3.3 g, 0.031 moles) was charged into a 4-neck jacketed round-bottom flask fitted with overhead mechanical stirrer. NMP (290 mL) was charged to the flask and the mixture was cooled to 10° C. with mild agitation under a nitrogen atmosphere. The flask was fitted with a heated addition funnel to which TMAC (65.4 g, 0.31 moles) was charged and heated to a minimum of 100° C. The molten TMAC was added to the solution of diamine in NMP at a rate sufficient not to exceed 40° C. with vigorous agitation. Once the addition was complete, external heating was applied to maintain 35-40° C. for 2 hours. Additional NMP (50 mL) was added and the reaction mixture discharged into a 500 mL beaker. The polymer solution was slowly added to water (4000 mL) in a stainless steel high-shear mixer. The precipitated polymer was filtered and washed multiple times with water to remove residual solvent and acid by-product. Degree of imidization, as measured by acid number titration was no higher than 50 mol. %.

General Procedure for Preparation of Water Solutions of LiPAI

Deionized water (175-250 mL) was charged to a 4-neck jacketed round-bottom flask fitted with overhead mechanical stirrer. The required amount of lithium carbonate was added and the solution heated to 70° C. With vigorous agitation, the PAI resin of example 1a or 1b (60.5 g at 20.7% solids) was added in step-wise fashion, allowing each portion to dissolve prior to further addition. After the entire polymer was charged to the reactor, heating was continued for 1-2 hours, at which time the homogenous solution was discharged. Solutions were further diluted during electrode slurry preparation to achieve desired binder loading in electrode.

Example 2: TMAC-ODA (50-50) Copolymer—5 Wt. % Polymer and 3 Eq. Lithium

General procedure for preparation of water solutions of LiPAI as above detailed was followed with TMAC-ODA (50-50) PAI of Example 1a (60.5 g at 20.7% solids) and lithium carbonate (3.70 g, 0.050 mol) dissolved in water (186 mL).

Example 3: TMAC-ODA (50-50) Copolymer—5 Wt. % Polymer and 1.5 Eq. Lithium

General procedure for preparation of water solutions of LiPAI as above detailed was followed with TMAC-ODA (50-50) PAI of Example 1a (60.5 g at 20.7% solids) and lithium carbonate (1.85 g, 0.025 mol) dissolved in water (188 mL).

Example 4: TMAC-ODA (50-50) Copolymer—5 Wt. % Polymer and 4 Eq. Lithium

General procedure for preparation of water solutions of LiPAI as above detailed was followed with TMAC-ODA (50-50) PAI of Example 1a (60.5 g at 20.7% solids) and lithium carbonate (4.69 g, 0.067 mol) dissolved in water (188 mL).

Example 5: TMAC-ODA (50-50) Copolymer—5 Wt. % Polymer and 5 Eq. Lithium

General procedure for preparation of water solutions of LiPAI as above detailed was followed with TMAC-ODA (50-50) PAI of Example 1a (60.5 g at 20.7% solids) and lithium carbonate (6.14 g, 0.083 mol) dissolved in water (188 mL).

Example 6: (TMAC-ODA)$_{90}$ (TMAC-MPDA)$_{10}$ PAI Copolymer—5 Wt. % Polymer and 3 Eq. Lithium General procedure for preparation of water solutions of LiPAI as above detailed was followed with (TMAC-ODA)$_{90}$ (TMAC-MPDA)$_{10}$ PAI Copolymer of Example 1b (52.4 g at 23.9% solids) and lithium carbonate (3.79 g, 0.051 mol) dissolved in water (194 mL).

Example 7: Torlon® PAI AI50—5 Wt. % Polymer and 3 Eq. Lithium

General procedure for preparation of water solutions of LiPAI as above detailed was followed with Torlon® PAI AI50 (94.7 g at 23.8% solids) and lithium carbonate (7.15 g, 0.10 mol) were dissolved in water (348 mL).

Example 8: Partially Neutralized TMAC-ODA (50-50) Copolymer—5 Wt. % Polymer and 3 Eq. Lithium (pH=8)

General procedure for preparation of water solutions of LiPAI as above detailed was followed with TMAC-ODA (50-50) PAI of Example 1a (60.5 g at 20.7% solids) and lithium carbonate (3.70 g, 0.050 mol) dissolved in water (188 mL), with the exception that, after 1-2 hours of heating, glacial acetic acid (3 mL) was added drop-wise to the mixture. Mixing at high speed was continued for another 15 minutes to ensure agglomerated polymer was re-dispersed. The solution was further diluted during electrode slurry preparation to achieve desired binder loading in electrode
Preparation of Electrode-Forming Compositions and Negative Electrodes Electrode-forming compositions and negative electrodes were prepared as detailed below using the following equipment:
Mechanical mixer: planetary mixer (Speedmixer) and mechanical mixer of the Dispermat® series with flat PTFE lightweight dispersion impeller;
Film coater/doctor blade: Elcometer® 4340 motorised/automatic film applicator;
Vacuum oven: BINDER APT line VD 53 with vacuum; and
Roll press: precision 4" hot rolling press/calender up to 100° C.
General Procedure for Preparation of Negative Electrode Including Lithiated PAI Resin An aqueous composition was prepared by mixing 20.16 g of a 6.2 wt. % solution of a LiPAI obtained in one of Examples 2 to 8, in water, 6.09 g of deionized water, 23.5 g of silicon/graphite, and 0.25 g of carbon black. The mixture was homogenized by moderate stirring in planetary mixer for 10 min and then mixed again by moderate stirring for 2 h.

A negative electrode was obtained by casting the binder composition thus obtained on a 20 µm thick copper foil with a doctor blade and drying the coating layer in an oven at temperature of 60° C. for about 60 minutes. The thickness of the dried coating layer was about 90 µm. The electrode was then hot pressed at 60° C. in a roll press to achieve target porosity (30%). The resulting negative electrode had the following composition: 94 wt. % of silicon/carbon, 5 wt. % of LiPAI and 1 wt. % of carbon black.
Electrodes E1, E2, E3, E4, E5, E6, E7 were prepared accordingly.

Example 9: Cured Negative Electrode

A negative electrode was prepared following the same procedure as detailed above, with the solution of LiPAI of Example 2, and was then cured under vacuum at about 210° C. for 30 min and at about 260° C. for additional 30 min to obtain a cured negative electrode.
Electrode 8 was thus obtained.

Comparative Example 1: Negative Electrode Including Torlonv PAI AI50

Torlon® PAI AI50 was first made water-soluble by neutralizing its amic acid groups with butyldiethanolamine. An aqueous composition was prepared by mixing 19.44 g of a 9 wt. % solution of the Torlon® PAI AI50 in 17.31 g of deionized water, 32.9 g of silicon/carbon, and 0.35 g of carbon black.

The mixture was homogenized by moderate stirring in a planetary mixer for 10 min and then mixed again by moderate stirring for 2 h giving a binder composition.

A negative electrode was obtained by casting the binder composition on a 20 µm thick copper foil with a doctor blade and drying the coating layer in an oven at temperature of 60° C. for about 60 minutes. The thickness of the dried coating layer was about 90 µm. The electrode was then hot pressed at 60° C. in a roll press to achieve target porosity (30%).

The negative electrode had the following composition: 94 wt. % of silicon/carbon, 5 wt. % of the PAI and 1 wt. % of carbon black.
Electrode E9 was thus obtained.

Comparative Example 2: Negative Electrode Including Torlon® PAI 4000T

An NMP composition was prepared by mixing 25.00 g of a 5 wt. % solution of Torlon® PAI 4000T in NMP, 1.25 g of NMP, 23.5 g of silicon/carbon and 0.25 g of carbon black. The mixture was homogenized by moderate stirring in planetary mixer for 10 min and then mixed again by moderate stirring for 2 h giving a binder composition.

A negative electrode was obtained by casting the binder composition on a 20 µm thick copper foil with a doctor blade and drying the coating layer in an oven at temperature ramp from 80° C. to 130° C. for about 60 minutes.

The thickness of the dried coating layer was about 90 µm. The electrode was then hot pressed at 90° C. in a roll press to achieve the target porosity (30%).

The negative electrode had the following composition: 94 wt. % of silicon/carbon, 5 wt. % of the PAI and 1 wt. % of carbon black.
Electrode E10 was thus obtained.

Comparative Example 3: Negative Electrode Including Styrene-Butadiene Rubber (SBR) and Carboxymethyl Cellulose (CMC)

An aqueous composition was prepared by mixing 29.17 g of a 2 wt. % solution of CMC, in 5.25 g of deionized water, 32.9 g of silicon/carbon and 0.35 g of carbon black. The mixture was homogenized by moderate stirring. After about 1 h of mixing, 2.33 g of SBR suspension was added to the composition and mixed again at low stirring for 1 h, to give a binder composition.

A negative electrode was obtained by casting the binder composition on a 20 μm thick copper foil with a doctor blade and drying the coating layer in an oven at temperature of 60° C. for about 60 minutes. The thickness of the dried coating layer was about 90 μm. The electrode was then hot pressed at 60° C. in a roll press to achieve target porosity (30%).

The negative electrode had the following composition: 94 wt. % of silicon/carbon, 1.66 wt. % of CMC, 3.33 wt. % of SBR, and 1 wt. % of carbon black.

Electrode E11 was thus obtained.

Comparative Example 4: Negative Electrode Including Poly(Amic Acid)

An aqueous composition was prepared by mixing 5.2 g of a PAA aqueous solution (35% w/w), 30.2 g of deionized water, 34.2 g of silicon/graphite, and 0.36 g of carbon black. The mixture was homogenized by moderate stirring in planetary mixer for 10 min and then mixed again by moderate stirring for 2 h to give a binder composition.

A negative electrode was obtained by casting the binder composition on a 20 μm thick copper foil with a doctor blade and drying the coating layer in an oven at temperature of 60° C. for about 60 minutes. The thickness of the dried coating layer was about 90 μm. The electrode was then hot pressed at 60° C. in a roll press to achieve target porosity (30%).

The negative electrode had the following composition: 94 wt. % of silicon/carbon, 5 wt. % of PAA, and 1 wt. % of carbon black.

Electrode E12 was thus obtained.

Manufacture of Batteries

Lithium coin cells (CR2032 type, 20 mm diameter) were prepared in a glove box under an Ar gas atmosphere by punching a small disk of the electrode prepared according to Examples 8-10 and Comparative Examples 11-14 together with lithium metal as a counter and reference electrode. The electrolyte used in the preparation of the coin cells was a standard 1M $LiPF_6$ solution in Selectilyte™ LP 30, with 2 wt. % of VC and 10 wt. % of F1EC additive; polyethylene separators (commercially available from Tonen Chemical Corporation) were used as received.

Capacity Retention Testing

After initial charge and discharge cycles at a low current rate, each of the two cells was galvanostatically cycled at a constant current rate of C/10-D/10 with positive cut off of 1.5V and negative cut off of 0.05V.

Capacities were measured in triplicate and are shown in FIG. 1 and corresponding Table 1 below:

TABLE 1

| Binder Example | Negative Electrode | Lithium | Solvent | Capacity retention after 25 cycles (mAh/g) | Capacity retention after 25 cycles % of the initial capacity | Capacity retention after 50 cycles (mAh/g) | Capacity retention after 50 cycles % of the initial capacity |
|---|---|---|---|---|---|---|---|
| Ex 2 | E1 | 3 eq. | $H_2O$ | 399 | 91 | 393 | 90 |
| Ex 3 | E2 | 1.5 eq. | $H_2O$ | 331 | 80 | 318 | 77 |
| Ex 4 | E3 | 4 eq. | $H_2O$ | 385 | 89 | 389 | 90 |
| Ex 5 | E4 | 5 eq. | $H_2O$ | 377 | 85 | 377 | 85 |
| Ex 6 | E5 | 3 eq. | $H_2O$ | 361 | 80 | 367 | 81 |
| Ex 7 | E6 | 3 eq. | $H_2O$ | 386 | 88 | 385 | 87 |
| Ex 8 | E7 | 3 eq. | $H_2O$ | 399 | 89 | 385 | 86 |
| Ex 9 (pH = 8) | E8 (E1 cured) | 3 eq. | $H_2O$ | 379 | 84 | 387 | 86 |
| Comp. Ex 1 | E9 | — | $H_2O$ | 273 | 70 | n.a.* | <70% |
| Comp. Ex 2 | E10 | — | NMP | 341 | 83 | n.a. | <80% |
| Comp. Ex 3 | E11 | — | $H_2O$ | 379 | 85 | 268 | 60 |
| Comp. Ex 4 | E12 | — | $H_2O$ | 293 | 66 | 254 | 57 |

*Not available.

From left to right, by column, Table 1 shows the example (or comparative example) number for the batteries tested, the corresponding negative electrode, the amount of equivalents of lithium used during preparation of the LiPAI (or PAI), the solvent that was used in the electrode-forming composition, and the capacity retention results at both 25 and 50 charge/discharge cycles shown as raw capacity and percent capacity of initial capacity.

Inventive Electrodes 1 and 7 were each surprisingly found to exhibit excellent capacity retention after both 25 and 50 cycles. And even more surprisingly, Electrode 1, representing an uncured LiPAI, registered significantly higher capacity retention than the comparative examples and was nearly unchanged even after 50 cycles.

Electrode 3 was found to exhibit satisfying capacity retention, far better than the comparative examples wherein electrodes prepared by aqueous compositions were used in the battery.

With regard to Comparative Example 3, which used a SBR/CMC binder, an 85% of initial capacity was observed after 25 cycles; however capacity was dramatically degraded after 50 cycles as shown in FIG. 1.

Should the disclosure of any patents, patent applications, and publications which are incorporated herein by reference conflict with the description of the present application to the extent that it may render a term unclear, the present description shall take precedence.

The invention claimed is:

1. A negative electrode comprising, based on the total weight of the electrode:
   0.5 to 15 wt. % of a LiPAI as binder,
   75 to 95 wt. % of a carbon-based material,
   3 to 50 wt. % of a silicon-based material, and
   0 to 5 wt. % of a electro-conductive additive;

wherein the LiPAI comprises:

0 to 50 mol. % of recurring units $R_{imide}$ of formula:

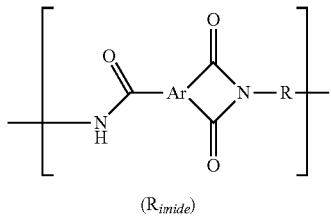

($R_{imide}$)

0 to 70 mol. % of recurring units $R_{amic\ acid}$ of formula:

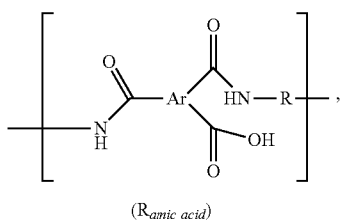

($R_{amic\ acid}$)

and 30 to 100 mol. % of recurring units $R_{Li\ salt}$ of formula

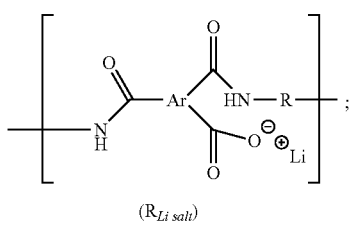

($R_{Li\ salt}$)

provided that recurring units $R_{imide}$, $R_{amic\ acid}$ and $R_{Li\ salt}$ collectively represent more than 50 mol. % of recurring units in the lithiated polyamide-imide (LiPAI), wherein:

Ar is a trivalent aromatic group selected from the group consisting of:

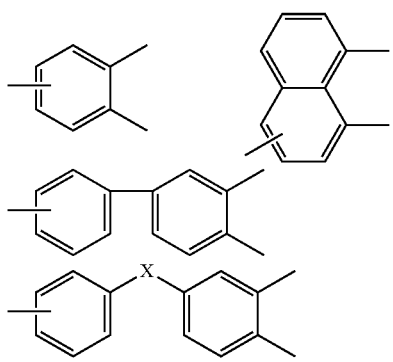

and corresponding optionally substituted structures;

X is selected from the group consisting of —O—, —C(O)—, —CH$_2$—, —C(CF$_3$)$_2$—, and —(CF$_2$)$_p$—, p being an integer from 1 to 5;

R is a divalent aromatic group selected from the group consisting of:

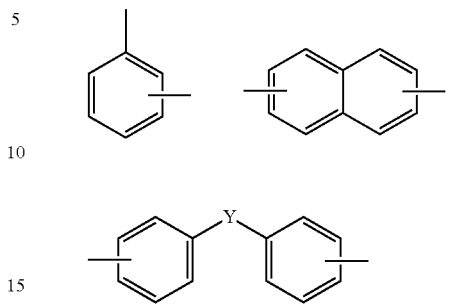

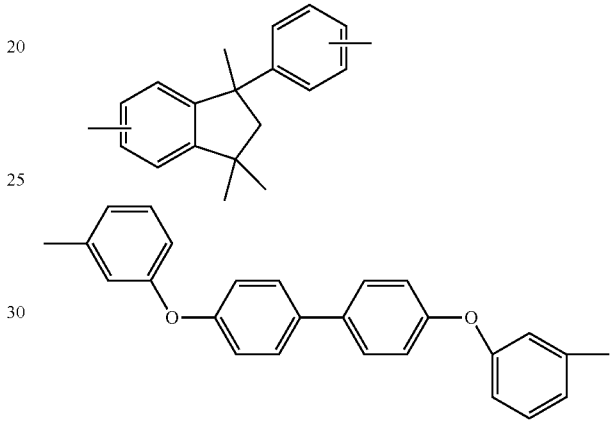

and corresponding optionally substituted structures, and

Y is selected from the group consisting of —O—, —S—, —SO$_2$—, —CH$_2$—, —C(O)—, —C(CF$_3$)$_2$—, and —(CF$_2$)$_q$—, q being an integer from 0 to 5.

2. The negative electrode of claim 1, wherein the carbon-based material is at least one selected from the group consisting of graphite and graphene, wherein the silicon-based material is at least one selected from the group consisting of silicon, alkoxysilane, aminosilane, silicon carbide and silicon oxide, and wherein the electro-conductive additive is carbon black.

3. The negative electrode of claim 1, wherein the LiPAI is uncured LiPAI.

4. The negative electrode comprising of claim 1, based on the total weight of the electrode:

0.5 to 10 wt. % of the LiPAI as binder, 85 to 90 wt. % of the carbon-based material, 10 to 50 wt. % of the silicon-based material, and 0.5 to 2.5 wt. % of the electro-conductive additive.

5. The negative electrode of claim 1, wherein the carbon-based material is graphite, wherein the silicon-based material is silicon, and wherein the electro-conductive additive is carbon black.

6. The negative electrode of claim 1, wherein the lithiated polyamide-imide (LiPAI) recurring units $R_{imide}$, $R_{amic\ acid}$, and $R_{Li\ salt}$ are respectively units of formulae:

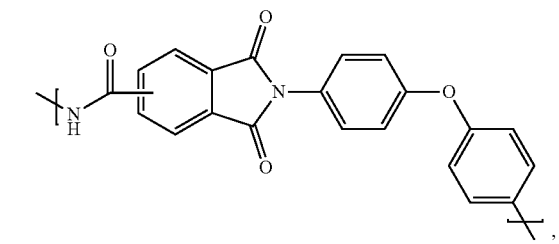

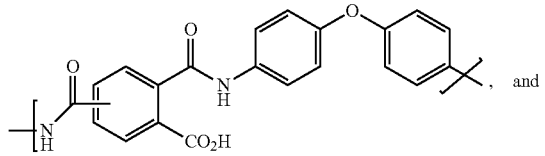, and

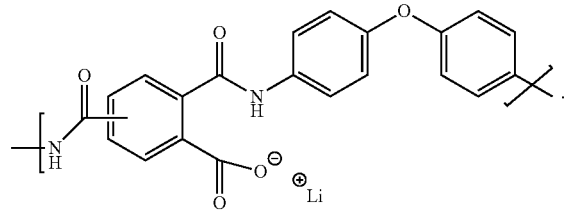.

7. The negative electrode of claim 1, wherein the lithiated polyamide-imide (LiPAI) recurring units $R_{imide}$, $R_{amic\ acid}$, and $R_{Li\ salt}$ are respectively units of formulae:

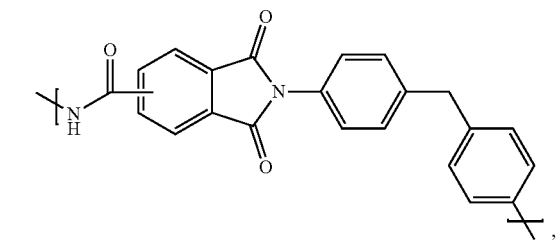,

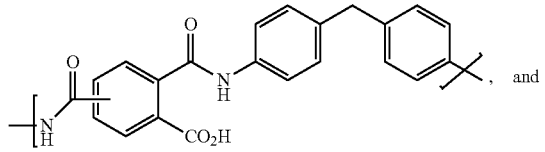, and

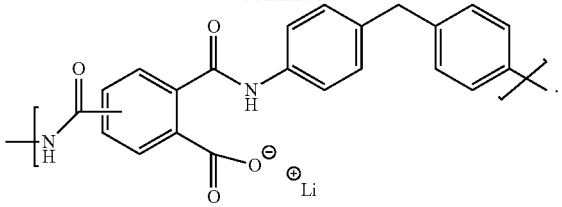.

8. The negative electrode of claim 1, wherein the lithiated polyamide-imide (LiPAI) recurring units $R_{imide}$, $R_{amic\ acid}$, and $R_{Li\ salt}$ are respectively units of formulae:

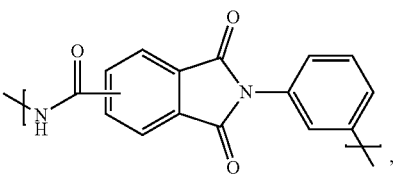,

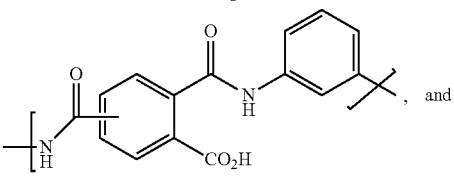, and

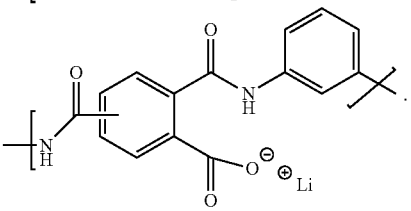.

9. The negative electrode of claim 1, wherein the amount of recurring units $R_{amic\ acid}$ ranges from 0 to 50 mol. %, and wherein the amount of recurring units $R_{Li\ salt}$ ranges from 50 to 100 mol. %.

10. The negative electrode of claim 1, wherein the lithiated polyamide-imide (LiPAI) comprises less than 30 mol. % of the recurring units $R_{imide}$.

11. The negative electrode of claim 1, wherein the lithiated polyamide-imide (LiPAI) has a molecular weight ranging from 1,000 g/mol to 10,000 g/mol.

12. A lithium-ion battery comprising the negative electrode of claim 1.

* * * * *